(12) United States Patent
Holmgren

(10) Patent No.: US 6,409,215 B1
(45) Date of Patent: Jun. 25, 2002

(54) OPERATING DEVICE FOR ANTI-SKID DEVICES FOR VEHICLES

(75) Inventor: Lars Holmgren, Vanesbord (SE)

(73) Assignee: VBG Produkter AB, Vänersborg (SE)

( * ) Notice: Subject to any disclaimer, the term of this patent is extended or adjusted under 35 U.S.C. 154(b) by 0 days.

(21) Appl. No.: 09/600,956

(22) PCT Filed: Jan. 27, 1999

(86) PCT No.: PCT/SE99/00107

§ 371 (c)(1),
(2), (4) Date: Aug. 24, 2000

(87) PCT Pub. No.: WO99/38714

PCT Pub. Date: Aug. 5, 1999

(30) Foreign Application Priority Data

Jan. 29, 1998 (SE) ................................................ 9800243

(51) Int. Cl.[7] ............................................. B60B 39/00
(52) U.S. Cl. .......................... 280/757; 92/137; 74/108; 188/4 B
(58) Field of Search ......................... 280/757; 188/4 B; 180/16; 74/89, 89.2, 89.21, 89.22, 108, 102; 152/208, 213 R, 214, 215, 216; 92/137; 474/1, 2, 148, 149, 166, 167, 202, 206

(56) References Cited

U.S. PATENT DOCUMENTS

| | | | | |
|---|---|---|---|---|
| 2,283,948 A | * | 5/1942 | Ridgway | 188/4 B |
| 2,655,269 A | * | 10/1953 | Przybylski | 74/89.21 |
| 2,886,138 A | * | 5/1959 | Bruner | 188/4 B |
| 3,267,816 A | * | 8/1966 | Graham | 92/137 |
| 3,709,105 A | * | 1/1973 | Ridley | 92/137 |
| 3,831,455 A | * | 8/1974 | Patrigini | 74/89.21 |
| 4,225,110 A | * | 9/1980 | Akkerman et al. | 92/137 |
| 4,312,432 A | * | 1/1982 | Sugawa | 74/89.22 |
| 4,657,118 A | * | 4/1987 | Andersson | 152/208 |
| 4,800,992 A | * | 1/1989 | Andersson et al. | 188/4 B |
| 4,901,809 A | | 2/1990 | Tschannen | |
| 5,035,171 A | * | 7/1991 | Gottling et al. | 92/137 |
| 5,386,888 A | | 2/1995 | Hofmann | |

FOREIGN PATENT DOCUMENTS

| | | | |
|---|---|---|---|
| EP | 0162823 A1 | | 11/1985 |
| EP | 0197902 A1 | | 10/1986 |
| EP | 0241411 A2 | | 10/1987 |
| EP | 0 255 468 A1 | * | 2/1988 |
| EP | 0278896 A1 | | 8/1988 |
| EP | 0443455 A1 | | 8/1991 |
| EP | 0487297 A1 | | 5/1992 |
| WO | WO 95/03944 | * | 2/1995 |

* cited by examiner

Primary Examiner—Lanna Mai
Assistant Examiner—Ruth Ilan
(74) Attorney, Agent, or Firm—Birch, Stewart, Kolasch & Birch, LLP

(57) ABSTRACT

An anti-skid mechanism operating device includes an operating unit and an operating arm pivotally supported thereby and intended to carry a rotary anti-skid and to operate the latter between an active position and a passive position. The operating unit is formed with a linear drive and a rotationally mounted rotary device, which is connected to the operating arm. A string-like drive transmission element extends essentially along the longitudinal axis of the drive, between the drive and the rotary device, in order to translate a linear movement of the drive into a pivotal movement of the operating arm in two opposite directions.

12 Claims, 1 Drawing Sheet

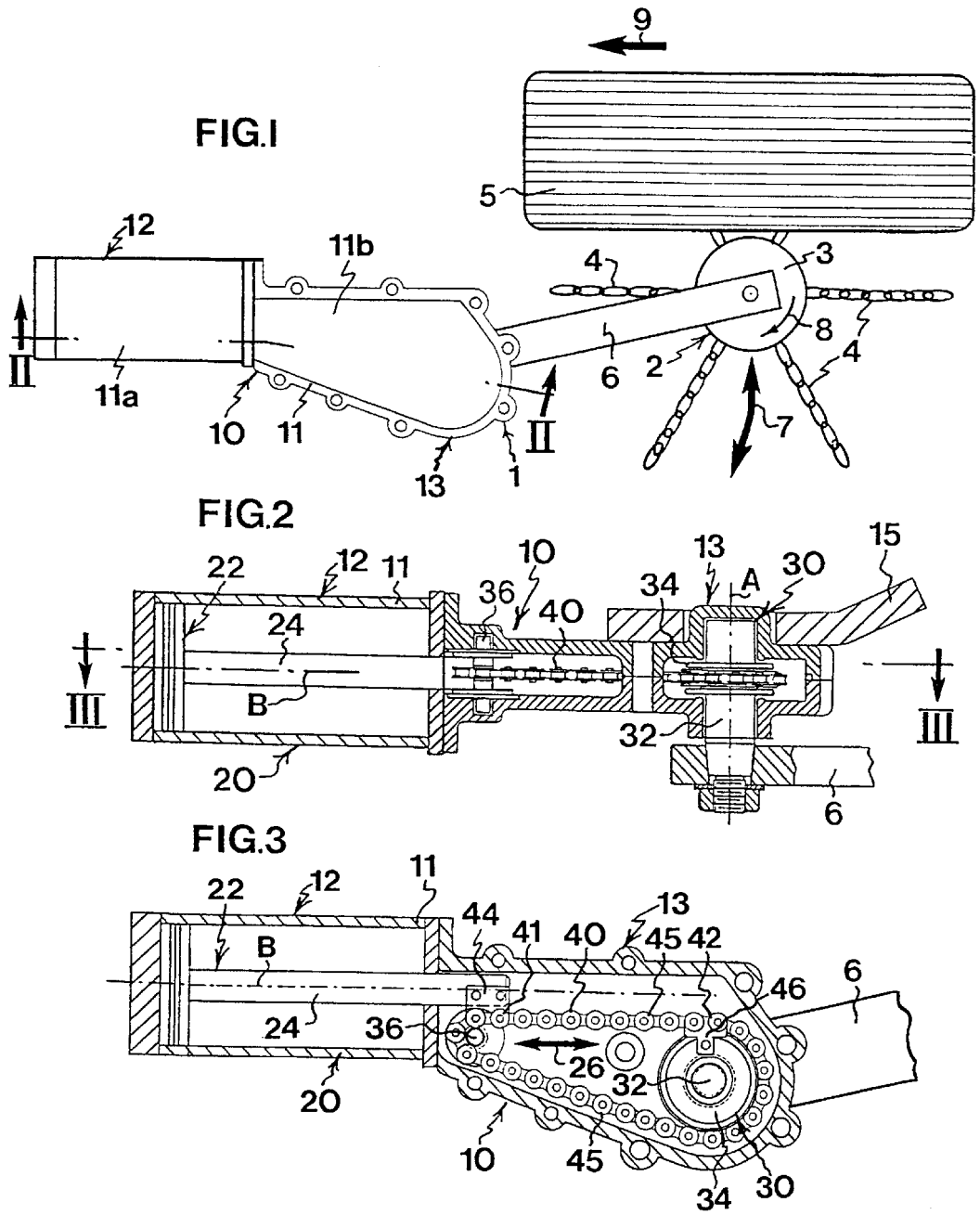

US 6,409,215 B1

OPERATING DEVICE FOR ANTI-SKID DEVICES FOR VEHICLES

This application is the national phase under 35 U.S.C. §371 of PCT International Application No. PCT/SE99/00107 which has an International filing date of Jan. 27, 1999, which designated the United States of America.

TECHNICAL FIELD

The present invention relates to an operating device for anti-skid devices.

PRIOR-ART TECHNOLOGY

Automatically operating anti-skid devices generally comprise an operating unit and an operating arm pivotally carried by said unit. An anti-skid means, usually a roller, to the periphery of which is attached a number of anti-skid elements in the form of short pieces of chain, is rotationally mounted on the operating arm. By pivoting the operating arm the anti-skid means may be shifted between an active position, in which the roller abuts against the side face of a vehicle wheel so as to be rotated thereby and to throw pieces of chain in between the wheel and a support, and a position of rest, wherein the roller is spaced from the wheel and lifted to a position underneath the vehicle.

When anti-skid devices of this kind are used it is important that the rotary anti-skid means abuts against the vehicle wheel at exactly the right place. It has also been found that the angle of the rotating anti-skid means in contact with the vehicle wheel relative to the plane of rotation of the vehicle wheel determines the degree of anti-skid effect that it is possible to obtain.

In the position of rest of the anti-skid device, the rotary anti-skid means must be shifted to a suitable location underneath the vehicle and spaced from the road surface as well as from the vehicle wheel.

Anti-skid devices of the kind to which the present invention relates generally are mounted on the rear axle of heavy-duty vehicles. In heavy-duty vehicles, considerable differences of appearance exist as to the configuration and design of the mounting place and the rear-axle area. Furthermore, the tolerances as to the design and the position of the rear axle are considerable in this type of vehicle. Consequently, it becomes necessary to mount the anti-skid device in a different manner in each vehicle model. For each discrete mounting instance the anti-skid device also needs to be set individually in order for the rotary anti-skid means to be correctly located in the active as well as in the passive position.

Particular difficulties are experienced in anti-skid devices that are to be mounted on buses and smaller vehicles because of the extremely reduced space available. This problem is felt to an increasing extent also in heavy-duty vehicles, since in modern trucks the available space around the rear axle tends to become increasingly smaller. Consequently, high demands are placed on anti-skid devices to be as small as possible.

EP-A-162 823 describes an anti-skid device of the kind defined above, wherein the operating unit comprises an air cylinder which is remote-connected to the operating arm via a lever and a first wire in order to pivot said arm to the active position by transmission of traction via the wire. A return spring is connected to a second wire, which in turn is connected to the operating arm in order to bias the spring, when the arm assumes the active position. Return of the operating arm to the position of rest deactivates the air cylinder, whereupon the return spring resets the operating arm to the position of rest by transmission of traction via the second wire.

A wire construction of this nature is sensitive to the salty and moist environment prevailing wintertime in the area of the vehicle chassis. In constructions of this kind, problems frequently arise from corrosive attacks on the wires, making them stick or rust away. In addition, stretching of the wires due to tensile stress is a possibility that also must be taken into consideration.

EP-B-278 896 describes an operating unit for anti-skid devices comprising a drive means in the form of an axially movable rack in engagement with a pinion, the latter in turn connected to the operating arm in order to pivot the latter. The pinion is arranged centrally relative to the area of movement of the rack and is located on the same shaft as the operating arm, for which reason also the operating arm is arranged centrally relative to the area of movement of the rack. Similar constructions are described also in EP-A-487 297 and EP-A-443 455.

A problem encountered in rack/pinion combinations of this kind is that they are complicated and consequently expensive to manufacture and to maintain. Another drawback found in these constructions is that they reduce the space available to the designer in positioning the operating unit underneath a vehicle because of the central location of the operating arm relative to the area of movement of the rack, for which reason it is difficult to position the operating device close to another component underneath the vehicle, which is often necessary.

SUMMARY OF THE INVENTION

The object of the present invention is to provide an operating device for anti-skid devices, which is greatly improved over the prior-art solutions described above.

One particular object is to provide an operating unit, which is incorporated in the device and gives the designer considerable freedom in positioning the unit on the bottom face of the vehicle.

These and other objects, which will appear from the following description, have now been achieved according to the teachings of the invention by means of an operating device of the kind defined in the introduction hereto.

Thus, a rotary means, arranged to rotate about a rotational shaft, is connected to a linear drive means, the force of which is exerted in the direction along a longitudinal axis, by means of a string-like drive transmission element in order to translate a linear movement of the drive means into a pivotal movement of an operating arm. The drive transmission element extends essentially along the longitudinal axis of the drive means between the drive means and the rotary means in order to transmit motion in two opposite directions between the drive means and the rotary means.

The drive transmission element is non-rotationally connected to the rotary means, i.e. it is securely attached to the rotary means in the peripheral direction, like, for example, a chain engaging a toothed wheel or a wire tightly lapping a wheel.

In this manner an operating device is provided, wherein the movement of a linear drive means may be translated into a rotational movement of a rotary means without the linear drive means having to extend past the rotary means on two sides of the latter. This makes it possible to install the rotary means in one end area of the operating unit and to connect one end of the operating arm directly to the rotary means, and consequently the operating unit may easily be placed in a convenient position underneath a vehicle, since the operating unit essentially extends in one single direction, from the point of attachment of the operating arm. This direction may be chosen optionally in adaptation to the individual configuration of different vehicles. The opposite end of the operating arm, i.e. the one spaced from the rotary means and the drive transmission element, may support an anti-skid means.

In addition, the operating arm may be pivoted within a large angular range without requiring additional space in more than one direction.

Because the drive transmission between the drive means and the rotary means is produced by a string-like means instead of by direct meshing of teeth on drive means and drive transmission means, respectively, it becomes possible to manufacture the operating unit at a lower cost than hitherto, due to the fact that the drive and rotary means need no longer be formed with a plurality of directly meshing toothed sections that need to be produced to a high degree of precision.

In accordance with a preferred embodiment the drive means act along a longitudinal axis essentially perpendicular to the rotational axis of the rotary means.

In accordance with another preferred embodiment, the drive transmission element is formed with a first portion, which is coupled to the drive means, and with a second portion, which is coupled to the rotary means.

In accordance with yet another preferred embodiment of the invention the drive transmission element extends in a continuous loop around the rotary means and around a deflector means, about which the drive transmission element is arranged to move. In a simple manner, this arrangement enables the drive transmission element to absorb motion in two opposite directions of movement without the element in itself having to be able to absorb compressive forces. Consequently, simple traction-absorbing drive transmission elements may be used, which is economically advantageous.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The invention will be described in more detail in the following with reference to the accompanying schematic drawing, which for exemplifying purposes shows a presently preferred, not restricting embodiment of the invention.

FIG. 1 is a schematic plan view of an anti-skid device having an anti-skid means positioned in close vicinity to a vehicle wheel.

FIG. 2 is a sectionalised view taken on line II—II in FIG. 1 of an operating device for an anti-skid device.

FIG. 3 is a sectionalised view of the operating unit, the view being taken on line III—III in FIG. 2.

DESCRIPTION OF A PREFERRED EMBODIMENT

Reference is made in the following to FIG. 1, which shows a preferred embodiment of an anti-skid device 1 mounted at a schematically represented vehicle wheel 5 of a motor vehicle. The anti-skid device 1 comprises an operating device including an operating unit 10 and an operating arm 6, which is pivotally supported by the operating unit 10, and an anti-skid means 2, which is rotationally mounted on the arm 6 and which comprises a roller 3 and a plurality of anti-skid elements in the form of pieces 4 of chain which are attached to the periphery of the roller 3. The operating arm 6 thus extends between the operating unit 10 and the anti-skid means 2.

By means of the operating unit 10, the operating arm 6 may be activated to perform a pivotal movement, shown by the double arrow 7, between an active position, as illustrated, and a position of rest. In the active position, the periphery of the roller 3 is in contact with the side face of the vehicle wheel 5, and consequently the roller 3 is rotated in the direction of arrow 8, throwing pieces 4 of chain in front of the vehicle wheel 5, between the latter and the road surface, when the vehicle travels in the direction of arrow 9. In the passive position (not shown), the anti-skid means 2 has been transferred away from the vehicle wheel 5 and the road surface to a suitable position underneath the vehicle.

The operating unit 10 will be described in closer detail in the following with reference to FIGS. 2 and 3. The operating unit 10 comprises a drive unit 12 and a transmission unit 13, which are enclosed in a drive unit housing 11a and in a transmission unit housing 11b, respectively, together forming a housing 11.

The drive unit 12 comprises a compressed-air cylinder 20 having a piston means 22 acting linearly along a longitudinal axis B, to thus form a drive means. The piston means 22 comprises a piston rod 24 protruding into the interior of the transmission unit 13. The compressed-air cylinder 20 is a double-acting cylinder, i.e. it is capable of driving the piston means 22 in both directions along the longitudinal axis B.

The transmission unit 13 is formed with a rotary means 30 extending along the longitudinal axis B and comprising a shaft 32, which is mounted for rotational movement about a rotational axis A, and a wheel 34, which is non-rotationally mounted on the shaft 32 and which is arranged to rotate in a rotational plane coinciding with the longitudinal axis B. In addition, the transmission unit 13 is fitted with a pulley 36, likewise mounted in the housing 11. A string-shaped and non-stretch drive transmission element, in the subject case a drive transmission chain 40, extends in a continuous loop around the rotary means and the pulley 36 and is connected to the end portion of the piston rod 24. The chain 40, the links of which are able to flex relative to one another, also is non-rotationally attached to the periphery of the wheel 34 and extends along a straight line, in parallel with the longitudinal axis B and close to the extension of the piston rod 24, when the latter assumes its position of maximum penetration into the transmission unit 13. As a result, the rotary means 30 will be rotated, as the piston means 22 is being displaced in its longitudinal direction B. As appears from FIG. 2, one end of the operating arm 6 is non-rotationally connected to the shaft 32 on the external face of the housing 11, for which reason the piston means 22, when displaced, will cause the arm 6 to perform a pivotal movement. The anti-skid means 2, mounted at the opposite end of the operating arm 6, spaced from the rotary means 30 and the drive transmission element 40, then is moved towards or away from the vehicle wheel 5. The radius of the wheel 34 determines the gear ratio between the movement of the drive means 22 and the movement of the operating arm 6.

The pulley 36, which is located in close vicinity to the drive means 22 in order to guide the chain 40 between the pulley 36 and the piston rod 22, can be formed with a small-size diameter, when the drive transmission element is a chain having mutually flexible links, a feature which contributes to the possibility of designing the operating unit as a compact-size means.

The transmission unit housing 11b, which encloses the transmission unit 13, efficiently protects the components of the latter from the effects of the environment. FIG. 2 also shows a holding member 15, which is mounted on the housing 11 and which is intended for attachment to the vehicle in order to keep the operating unit stable.

The chain 40 comprises a first portion 41, which is fitted with a fastening means in the form of a fastening plate 44 forming part of a link of the chain 40 and being attached to the piston rod 24 by means of screws or some other suitable means. A second portion 42 of the chain 40 is formed with a corresponding fastening means including a link having a fastening plate 46, which is attached to the periphery of the wheel 34. Such drive-transmitting connections may also be achieved in some other suitable manner, such as for example by means fitting the wheel 34 and/or the piston rod 24 with teeth in engagement with the links of the chain 40. The solution appearing from the drawing figures is, however, advantageous from a manufacturing point of view, inasmuch as smooth wheels are easier and cheaper to manufacture than toothed wheels.

In accordance with the invention the string-like drive transmission element 40 is capable of transferring motion between the drive means 22 and the rotary means 40 in two opposite directions (double arrow 26 of FIG. 3) in the longitudinal direction B. In accordance with an alternative embodiment, such transmission could be achieved without element 40 being configured as a continuous traction absorbing loop. The drive transmission element 40 could, for example be configured as a piece of string extending from the drive means 22 in the longitudinal direction B thereof to the periphery of the rotary means 40 and being in itself capable of absorbing traction as well as compressive forces, for example a chain the links of which may turn in one direction only. However, also in this case the drive transmission element is arranged to flex in at least one direction in order to be able to adapt itself to the periphery of the rotary means as the latter is moving.

In accordance with one aspect of the invention, the chain 40 forms a drive-transmitting prolongation of the drive means 22, which prolongation is deflected laterally around the rotary means 30, thus requiring space in the longitudinal direction B only to one side of the rotary means 30. In this case, the drive means 22 is located spaced from the rotary means 30 in a first end position and in a second end position it extends closer to or up to the rotary means 30. The prolongation of the longitudinal axis B then is in parallel with the drive-transmitting part of the chain.

In accordance with the shown embodiment, the compressed-air cylinder 20 is of the double-acting type without any spring means being connected thereto. Consequently, the dimensions of the compressed-air cylinder 20 may be small, since no return spring force need to be overcome, which further increases the freedom of choice in the mounting of the anti-skid device. A return spring of the heavy kind usually used in anti-skid devices in itself constitutes safety risk during mounting and maintenance work.

Finally, it should be pointed out that the invention should not in any way be regarded as limited to the embodiment described herein but that modifications are possible within the scope of the inventive idea as expressed in the appended claims.

For example, the invention is applicable to linearly acting drive means that are operated by other power sources than compressed air. In addition, a return spring may be connected to the drive means, should this be desirable in some situations. The drive-transmission element need not be a chain but could be formed by any other string-like means that is able to transfer motion in its longitudinal direction. In addition, the inventive concept is applicable to the illustrated type of anti-skid means incorporating a roller as well as to other types of rotary anti-skid means.

What is claimed is:

1. An operating device for anti-skid devices for vehicles, comprising:
    an operating unit, and
    an operating arm for supporting at an end spaced from the operating unit a rotary anti-skid means, said operating arm being pivotally mounted on the operating unit for movement between an active position and a rest position,
    said operating unit including:
        a linear drive acting along a longitudinal axis,
        a rotary rotatable about a rotational axis,
        a deflector, and
        a drive transmission element extending in a continuous loop around the rotary and the deflector, and extending essentially along the longitudinal axis of the drive between the drive and the rotary,
            said drive transmission element being arranged to translate linear movement of the drive in two opposite directions into rotational movement of the rotary, said rotational movement producing a pivotal movement of said operating arm between the active position and the rest position.

2. The operating device as claimed in claim 1, wherein the rotational axis extends essentially perpendicular to the longitudinal axis.

3. The operating device as claimed in claim 1, wherein the rotary is rotatable in a rotational plane, which is essentially parallel with the longitudinal axis of the drive means.

4. The operating device as claimed in claim 1, wherein the drive transmission element is at least partly flexible in at least one direction.

5. The operating device as claimed in claim 1, wherein the drive transmission element is a chain having links, the links being flexible relative to one another.

6. The operating device as claimed in claim 5, wherein traction and compressive forces are transmittable by the transmission element.

7. The operating device as claimed in claim 1, wherein the drive transmission element is anchored to a peripheral part of the rotary.

8. The operating means as claimed in claim 1, wherein the operating unit is of an elongated configuration, said rotary means being located in an end portion of said operating unit.

9. The operating device as claimed in claim 1, wherein the drive is a compressed-air piston located in a compressed-air cylinder and having a piston rod connected to said drive transmission element.

10. The operating device as claimed in claim 1, wherein the drive, the drive transmission element, and the rotary are enclosed in a housing.

11. An anti-skid device for motor vehicles which is fitted with an operating unit in accordance with claim 1.

12. A motor vehicle which is fitted with an anti-skid device in accordance with claim 11.

* * * * *